United States Patent [19]

Stephenson et al.

[11] 4,007,948
[45] Feb. 15, 1977

[54] RELEASE FOR SAFETY BELT TENSION-RELIEVING APPARATUS

[75] Inventors: Robert Larry Stephenson, Sterling Heights; Yogendra Singh Loomba, Washington; William Robert Fox, Warren, all of Mich.

[73] Assignee: Allied Chemical Corporation, Morris Township, N.J.

[22] Filed: Apr. 26, 1976

[21] Appl. No.: 680,610

Related U.S. Application Data

[63] Continuation of Ser. No. 577,146, May 13, 1975, abandoned.

[52] U.S. Cl. .............................. 280/744; 180/82 C; 180/112
[51] Int. Cl.² ........................................ B60R 21/10
[58] Field of Search ............... 180/82 C, 112, 113; 280/744, 745; 307/105 B; 297/388; 242/107.4, 107.7

[56] References Cited

UNITED STATES PATENTS

| | | | |
|---|---|---|---|
| 3,610,361 | 10/1971 | Pringle | 180/82 C |
| 3,764,161 | 10/1973 | Bright | 280/744 |
| 3,767,603 | 3/1974 | Loomba | 280/744 X |
| 3,794,135 | 2/1974 | Ewert | 180/82 C |
| 3,807,523 | 4/1974 | Fiala | 180/82 C |
| 3,848,888 | 11/1974 | Kamaoka | 280/744 |
| 3,851,836 | 12/1974 | Sprecher | 242/107.7 |
| 3,858,826 | 1/1975 | Sprecher | 242/107.7 |
| 3,869,098 | 3/1975 | Sprecher | 242/107.4 A |
| 3,908,928 | 9/1975 | Okada | 280/744 X |
| 3,915,254 | 10/1975 | Nagano | 280/745 X |

Primary Examiner—Joseph F. Peters
Assistant Examiner—Terrance L. Siemens
Attorney, Agent, or Firm—John P. Kirby, Jr.

[57] ABSTRACT

A release means for a safety belt tension-relieving apparatus of a safety belt retractor includes: a sensing means, a locking means, an actuating means, and a baising means. The sensing means is located in a door-jam of a vehicle door for sensing a condition when the door is open and when the door is closed. The locking means is disposed on the retractor. The sensing means causes the locking means to move to its unlocking position when the door is open. The actuating means is mounted on the retractor adjacent to the locking means. The actuating means is mechanically coupled to a portion of the locking means and electrically coupled to the sensing means. The actuating means moves the locking means to its unlocking position, thereby allowing a rewind mechanism of the retractor to operate when the door is opened. The biasing means biases the locking means in a ready position, wherein the locking means may be operated by the tenson-relieving apparatus to block the rewind mechanism and relieves tension on the shoulder belt when the door is closed.

17 Claims, 6 Drawing Figures

RELEASE FOR SAFETY BELT TENSION-RELIEVING APPARATUS

This is a continuation, of Application Ser. No. 577,146, filed May 13, 1975, now abandoned.

BACKGROUND OF THE INVENTION

This invention relates to a vehicle safety belt system adapted to restrain an occupant in his seat and to a safety belt, tension-relieving apparatus adapted to relieve tension on a safety belt when in use by an occupant of the vehicle. More particularly, this invention relates to an improved release means for releasing a known tension-relieving apparatus.

An example of a known tension-relieving apparatus for which the release means of the present invention may be used is a mechanical tension-relieving apparatus disclosed in U.S. Pat. No. 3,851,836 and in U.S. Pat. No. 3,869,098, both entitled "Vehicle Occupant Restraint Belt Retractor" and both filed Aug. 23, 1973 in the name of R. G. Sprecher.

SUMMARY OF THE INVENTION

The improvement of the present invention is for use in a vehicle safety belt system adapted to restrain an occupant in the vehicle seat. The safety belt system includes a safety belt, a retractor having a rewind mechanism biased to rewind the safety belt on a reel of the retractor and a tension-relieving apparatus for relieving tension on the safety belt. The tension is applied by the rewind mechanism of the retractor. The improvement of the present invention is a release means for the tension-relieving apparatus. The release means includes: a sensing means, a tension-relieving locking means, an actuating means, and a biasing means.

The sensing means is disposed in a door-jam of a door of the vehicle for sensing a condition when the door of the vehicle is open. The tension-relieving locking means is disposed on the retractor. The tension-relieving locking means has a ready position wherein the locking means may be operated by the tension-relieving apparatus and an unlocking position wherein the rewind mechanism is allowed to wind the safety belt into the retractor. The sensing means causes the tension-relieving locking means to move to its unlocking position when the door is open, thereby deactivating the tension-relieving apparatus and allowing the rewind mechanism to wind the safety belt into the retractor. The actuating means is mounted on the retractor adjacent to the tension-relieving locking means. The actuating means is mechanically coupled to a portion of the tension-relieving locking means and electrically coupled to the sensing means. The actuating means moves the tension-relieving locking means to its unlocking position, thereby allowing the rewind mechanism of the retractor to operate when the door is open. The biasing means biases the tension-relieving locking means in its ready position, wherein the locking means may be operated by the tension-relieving apparatus to block the rewind mechanism and relieve tension on the shoulder belt when the door is closed.

The tension-relieving locking means includes: a tension-relieving ratchet wheel connected to the reel of the retractor; and a tension-relieving locking pawl for locking the tension-relieving ratchet wheel. The locking means may also include linkage means connecting the locking pawl to the actuating means. The actuating means may be a solenoid having a plunger coupled directly or indirectly to the tension-relieving locking pawl or an electromagnet coupled to the tension-relieving locking pawl. Three embodiments are described hereinafter.

DETAILED DESCRIPTION

Figure 1:
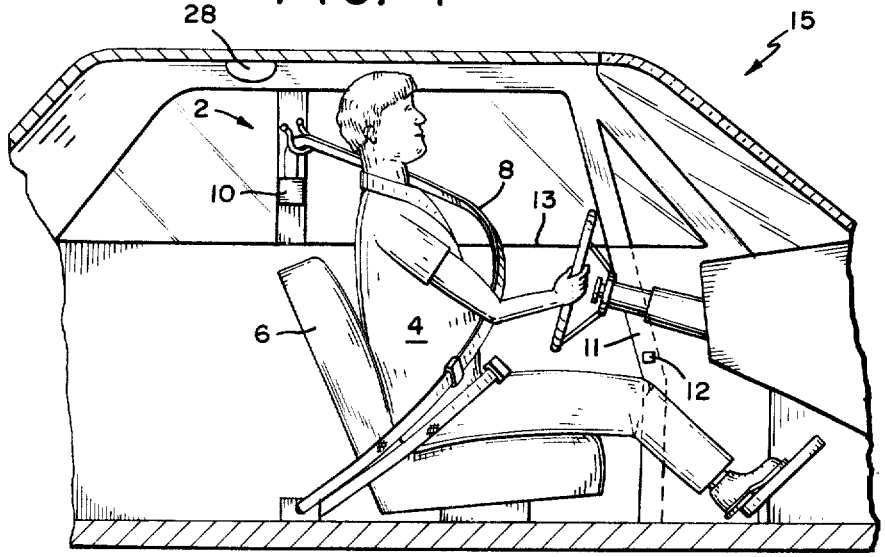
FIG. 1 is a simplified illustration of the improvement of the present invention installed in a vehicle.

Referring to FIG. 1, the improvement of the present invention is for use in a vehicle safety belt system 2 adapted to restrain an occupant 4 in the vehicle seat 6. The safety belt system 2 includes a safety belt, including a shoulder belt 8, a lap belt, or both; a retractor 10 having a rewind mechanism (not shown) biased to rewind the shoulder belt 8 on a reel of the retractor 10; and a tension-relieving apparatus for relieving tension on the safety belt, such as the shoulder belt 8. The tension is applied by the rewind mechanism of the retractor 10. The improvement of the present invention is a release means for the tension-relieving apparatus. Referring to FIGS. 1 – 5, the release means includes: a sensing means 12 (FIG. 1), a tension-relieving locking means 14 (FIGS. 2–5), an actuating means 16 (FIGS. 2–5), and a biasing means 18 (FIGS. 2–5).

The sensing means 12 may be a switch disposed in a doorjam 11 of a door 13 of a vehicle 15 for mechanically sensing a condition when the door 13 of the vehicle 15 is opened and when the door 13 is closed. The tension-relieving locking means 14 is disposed on the retractor 10, either within the retractor housing or on the outside of the retractor housing. The tension-relieving locking means 14 has a ready position in which the locking means 14 is in a position to be operated by a known tension-relieving apparatus. The known tension-relieving apparatus moves the locking means 14 into a locking position wherein the locking means 14 opposes or counteracts the force applied by the rewind spring (not shown) and thereby relieves tension on the shoulder belt 8. The known tension-relieving apparatus may, for example, be the apparatus described in U.S. Pat. No. 3,851,836 or the apparatus described in U.S. Pat. No. 3,869,098. The locking means 14 also has an unlocking position wherein the rewind mechanism is allowed to wind the shoulder belt 8 into the retractor 10.

The sensing means 12 causes the tension-relieving locking means 14 to move to its unlocking position when the door 13 is open, thereby deactivating the tension-relieving apparatus and allowing the rewind mechanism to wind the shoulder belt 8 into the retractor 10. The actuating means 16 is mounted on the retractor 10 adjacent to the tension-relieving locking means 14. The actuating means 16 is mechanically coupled to a portion of the tension-relieving locking means 14 and electrically coupled to the sensing means 12. The actuating means 16 moves the tension-relieving locking means 14 to its unlocking position, thereby releasing the tension-relieving apparatus and allowing the rewind mechanism of the retractor 10 to operate when the door is opened. The biasing means 18 biases the tension-relieving locking means 14 in its ready position, in which the locking means 14 may be operated by the tension-relieving apparatus to block, that is, oppose or counteract the rewind mechanism and relieve tension on the shoulder belt 8 when the door 13 is closed.

The locking means 14 includes: a tension-relieving ratchet wheel 20 connected to the reel 22 of the retractor 10; and a tension-relieving locking pawl 24 for engaging and locking the tension-relieving ratchet wheel 20, thereby blocking or deactivating the rewind mechanism. The tension-relieving ratchet wheel 20 and the tension-relieving locking pawl 24 are separate from and should not be confused with a different ratchet wheel and locking pawl often used in safety belt retractors for locking the retractor during emergency conditions, such as when the vehicle is subjected to sudden deceleration, acceleration or roll-over or when unwinding of the safety belt is suddenly accelerated. The rewind mechanism (not shown) typically is a spiral spring installed in the retractor 10. The rewind mechanism is well known in the art. An example of such a rewind mechanism is disclosed in U.S. Pat. Nos. 3,610,361 (reference numeral 210); 3,741,496 (reference numeral 13); and 3,797,603 (reference numeral 64).

Figure 2:
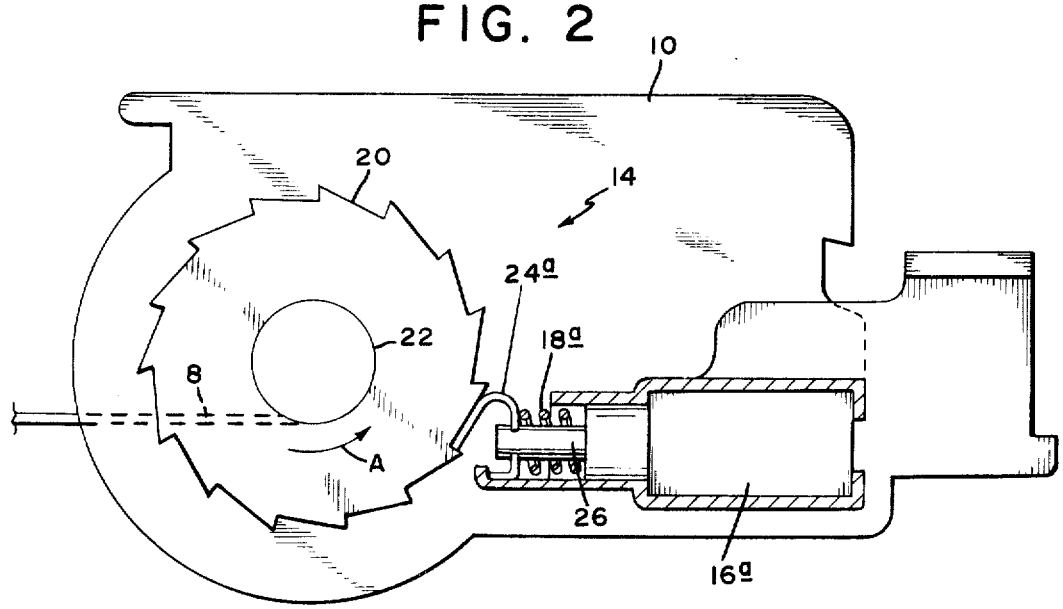
FIG. 2 is a side elevational view of a portion of a first embodiment of the present invention showing the locking means and the actuating means.
Figure 3:
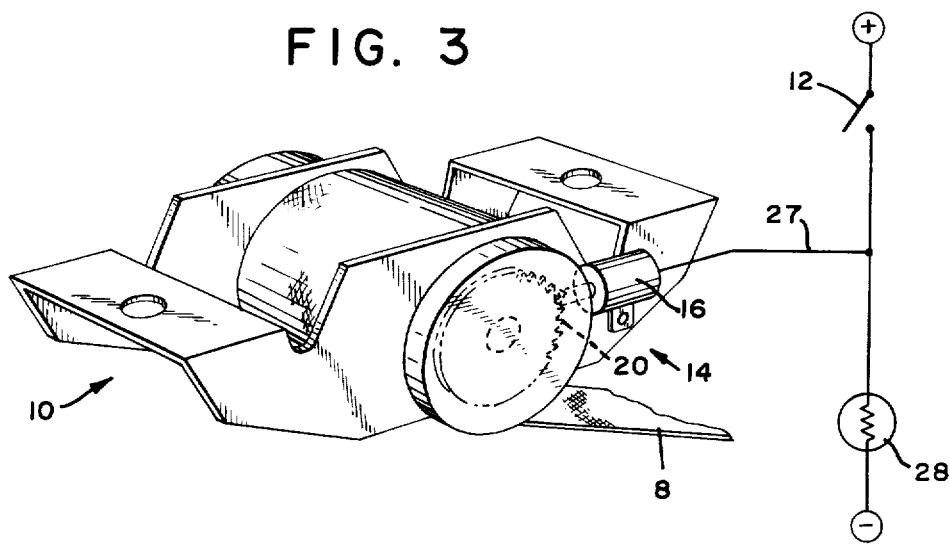
FIG. 3 is a simplified schematic illustration of the first embodiment of the present invention.

In a first embodiment, illustrated in FIGS. 2 and 3, the actuating means 16 may be a solenoid 16a having a plunger 26 connected to a tension-relieving locking pawl 24a. The locking means 14 includes the ratchet wheel 20 and the locking pawl 24a. FIG. 2 shows the solenoid 16a in its deactivated position with the plunger 26 pushed partially out of the solenoid 16a. The biasing means 18 may be a spiral spring 18a arranged around the plunger 26 which biases the plunger 26 in its extended position from the solenoid 16a. The rewind mechanism (not shown) rewinds the seat belt in a counterclockwise direction as indicated by arrow A in FIG. 2. The rewind direction is the direction in which the reel 22 is wound in order to wind the shoulder belt 8 into the retractor 10. The ratchet teeth of the tension-relieving ratchet wheel 20 are arranged so that when the ratchet wheel 20 is wound in the rewind direction, the ratchet teeth may be engaged by the tension-relieving locking pawl 24. Tension-relieving locking pawl 24a may be attached to the outer end of the plunger 26, that is, the end of the plunger 26 opposite from the solenoid 16a. The tension-relieving locking pawl 24a may have a curved, hook-like configuration, which has been shaped to facilitate engagement of a ratchet tooth of the ratchet wheel 20.

Figure 4:
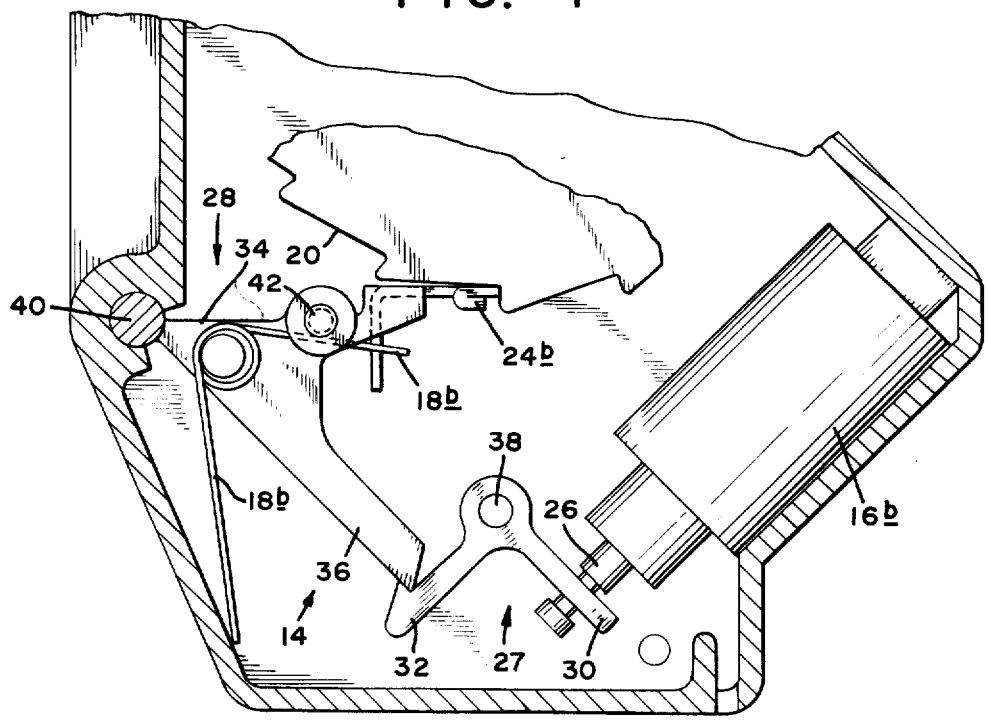
FIG. 4 is a side elevational view of a portion of a second embodiment of the present invention showing the locking means and the actuating means.

In a second embodiment illustrated in FIG. 4, the tension-relieving locking means 14 may further include a linkage means arranged between the plunger 26 and the tension-relieving locking pawl 24b, in addition to the ratchet wheel 20 and the locking pawl 24b. The linkage means includes: an L-shaped plunger bracket 27 and a pawl bracket 28. The plunger bracket 27 has a first leg 30 and a second leg 32. The pawl bracket 28 also has a first leg 34 and a second leg 36. The legs 30 and 32 of the plunger bracket 27 may be arranged approximately perpendicular to one another. The plunger bracket 27 pivots about a first pivot point 38. The legs 34 and 36 of the pawl bracket 28 may be arranged at an angle of less than 90° with reference to one another and preferably at an angle in the range of approximately 30° to 45°. The pawl bracket 28 pivots about a second pivot point 40. The locking pawl 24b is connected to the first leg 34 of the pawl bracket 28 adjacent to the opposite end from second pivot point 40. The locking pawl 24b pivots about a third pivot point 42 located on the first leg 34 of pawl bracket 28. The second leg 32 of the plunger bracket 26 is positioned adjacent to the second leg 36 of the pawl bracket 28. A biasing means in the form of a torsion spring 18b biases the pawl 24b in the ready position in which the pawl 24b is ready to engage the ratchet wheel 20. Thus, the second embodiment includes three separate pivot points: a first pivot point 38 for the plunger bracket 26; a second pivot point 40 for the pawl bracket 28; and a third pivot point 42 for the pawl 24b itself. The linkage means allows the actuating means 16 to be mounted in various positions with reference to the retractor. The pawl 24b has a first arm 25 which engages the ratchet wheel 20 and a second arm which is acted upon by the torsion spring 18b. The first arm 25 is arranged approximately perpendicular to the second arm 23.

FIG. 4 shows the solenoid 16b in its deactivated position with the plunger 26 pushed partially out of the solenoid 16. The plunger 26 presses the leg 32 of the plunger bracket 26 into contact and engagement with the leg 36 of the pawl bracket 28, which presses the pawl 24b into a position in which it is ready for engagement with the ratchet wheel 20. The solenoid 16b is in its deactivated position when the door 13 is closed. When the door 13 is opened, the solenoid 16b is activated, causing the plunger 26 to be withdrawn into the solenoid 16b, moving leg 32 of bracket 26 away from leg 34 of pawl bracket 28. The force from the rewind mechanism (not shown) exerted through the tension-relieving ratchet wheel 20 overcomes the force of the torsion spring 18b and pushes the locking pawl 24 away from the ratchet wheel 20 and into the unlocking position of the locking means 14.

In the operation of the first and second embodiments (FIGS. 1–4), when the occupant 4 enters the vehicle and closes the door 13, the sensing means 12 closes, deactivating the actuating means 16, allowing the biasing means 18 to press the tension-relieving locking pawl 24 into a ready position so that it can be moved into engagement with the tension-relieving ratchet wheel 20. The locking pawl 24 is not actually moved into engagement with the tension-relieving ratchet wheel 20 by the release means of the present invention, but is merely placed in a position where it can be placed in engagement with ratchet wheel 20 by a known tension-relieving apparatus such as that disclosed in U.S. Pat. No. 3,851,836 or U.S. Pat. No. 3,869,098.

Referring to FIGS. 1–4, the sensing means 12 may be connected to the actuating means 16 (FIGS. 2 and 4) by an electrical wire 27 (FIG. 3). Referring to FIG. 3, the electric wire may be the same wire which is conventionally used for operating a courtesy light in the vehicle, such as a dome light 29 in the interior ceiling of the vehicle. Furthermore, the sensing means 12 may be a switch similar to switches conventionally used in the door-jam of the door 13 of the vehicle for operating the dome light 28. Indeed, the sensing means 12 may be the same switch which is conventionally used for operating the dome light 29. The use of a switch in the door-jam of the vehicle provides a simple, efficient means for actuating the tension-relieving mechanism. Such means is simple because it reduces the number of moving parts and allows the use of a commercially available switch.

Figure 5:
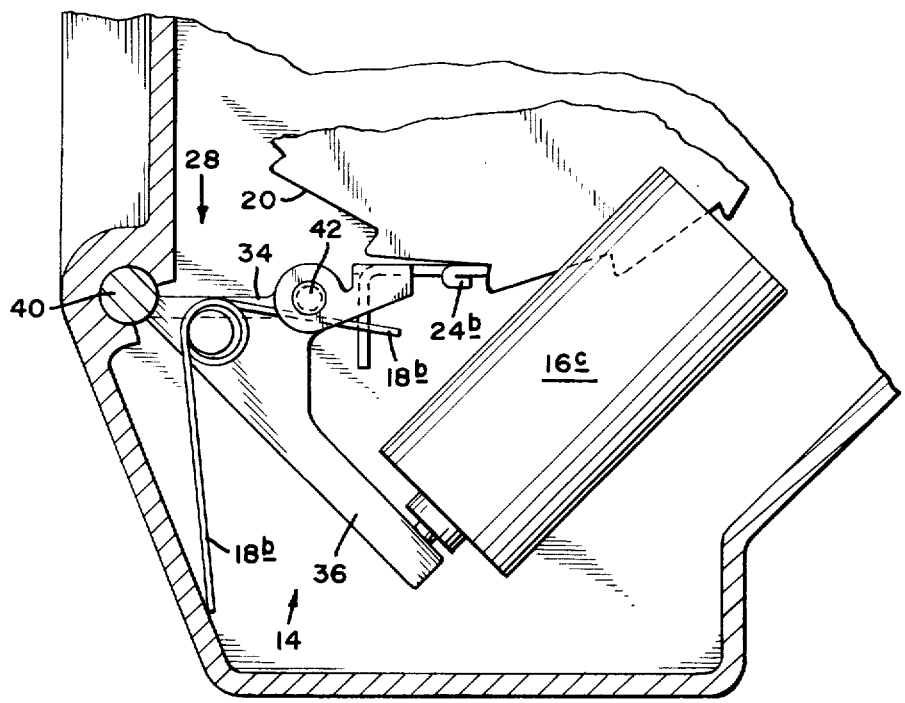
FIG. 5 is a side elevational view of a portion of a third embodiment of the present invention showing the locking means and the actuating means.

In a third embodiment, illustrated in FIG. 5, the actuating means 16 may be an electromagnet 16c. The locking means 14 may further include a pawl bracket 28, similar to the pawl bracket 28 in the second embodiment, in addition to a ratchet wheel 20 and a locking pawl 24b, similar to the locking pawl 24b in the second embodiment. The third embodiment does not use a plunger bracket. Referring to FIG. 5, the electromagnet 16c is shown in its energized position in which it attracts and holds the leg 36 of the pawl bracket 28.

In operation, when the electromagnet 16c is in its energized position, the pawl 24b is held in a ready position in which it can be moved by the known tension-relieving apparatus into engagement with the ratchet wheel 20, relieving tension on the shoulder belt. When the electromagnet 16c is de-energized, it no longer exerts a force on leg 34, allowing leg 34 to fall away. When leg 34 falls away from the electromagnet 16c, the pawl 24b falls away from the tension-relieving ratchet wheel 20 as a result of the force exerted by the rewind mechanism (not shown) transmitted through the ratchet wheel 20 which pushes the pawl 24b away from the ratchet wheel 20.

Figure 6:
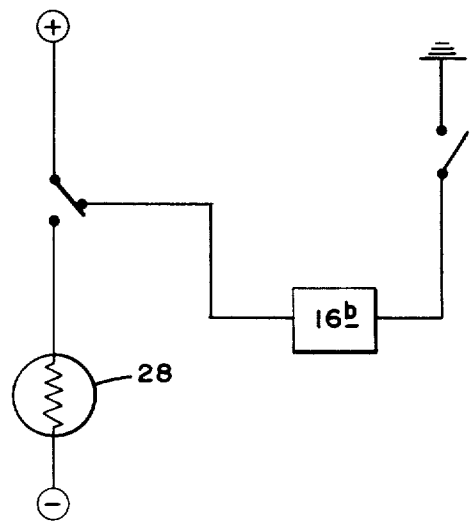
FIG. 6 is a simplified electrical schematic of a portion of the third embodiment shown in FIG. 5.

Referring to FIG. 6, when the door 13 is closed and the ignition 46 is turned, power is provided to energize the electromagnet 16c. When the door 13 is open or the ignition 46 is turned off, the electromagnet 16 is de-energized.

All three embodiments overcome the problem of allowing the shoulder belt 8 to hang loosely when the occupant 4 leaves the vehicle. As a result of the release means of the present invention, the shoulder belt 8 does not become caught in the door 13 of the vehicle. The term "connected" as used in the description of this invention means a direct attachment without any intermediate components. The term "coupled" as used in the description of this invention means either a direct attachment or an indirect attachment with intermediate components.

We claim:

1. In a vehicle safety belt system adapted to restrain an occupant in a vehicle seat, the safety belt system including a safety belt, a retractor having a rewind mechanism biased to rewind the safety belt on a reel of the retractor, a tension-relieving apparatus for relieving tension on the safety belt, the tension applied by the rewind mechanism of the retractor, the improvement of a release means for said tension-relieving apparatus, the release means comprising:

a sensing means disposed in a door jam of a door of said vehicle for sensing a condition when said door of the vehicle is open;

a tension-relieving locking means disposed on the retractor, the tension-relieving locking means having a ready position wherein said locking means may be operated by said tension-relieving apparatus and an unlocking position wherein the rewind mechanism is allowed to wind the safety belt into the retractor, said sensing means causing said tension-relieving locking means to move to its unlocking position when said door is open, thereby deactivating the tension-relieving apparatus and allowing the rewind mechanism to wind the safety belt into the retractor;

an actuating means mounted on the retractor adjacent to said locking means, mechanically coupled to a portion of said tension-relieving locking means and electrically coupled to said sensing means, said actuating means moving said tension-relieving locking means to its unlocking position thereby allowing the rewind mechanism of the retractor to operate when the door is open; and a biasing means biasing said tension-relieving locking means in its ready position, wherein said locking means may be operated by said tension relieving apparatus to block the rewind mechanism and relieving tension on the safety belt when the door is closed.

2. The safety belt tension-relieving apparatus of claim 1 wherein said locking means comprises: a tension-relieving ratchet wheel connected to the reel of the retractor and a locking pawl for locking said tension-relieving ratchet wheel.

3. The safety belt tension-relieving apparatus of claim 1 wherein said actuating means is a solenoid having a plunger coupled to said locking pawl.

4. The safety belt tension-relieving apparatus of claim 2 wherein said locking means further comprises linkage means connecting said locking pawl to said actuating means.

5. The safety belt tension-relieving apparatus of claim 2 wherein said locking means further comprises a pawl bracket having a first leg, a second leg, and a pivot point for said pawl bracket; said locking pawl mounted on said first leg and having a pawl pivot point on said first leg.

6. The safety belt tension-relieving apparatus of claim 5 wherein said actuating means is an electromagnet having an energized condition wherein said electromagnet applies a magnet force to said second leg of said pawl bracket to attract said second leg to said electromagnet and thereby move said pawl bracket and said tension-relieving locking pawl to said ready position.

7. The safety belt tension-relieving apparatus of claim 5 wherein said locking means further comprises a plunger bracket having a first leg, a second leg, and a pivot point for said plunger bracket; said second leg of said plunger bracket arranged adjacent said second leg of said pawl bracket, said second leg of said plunger bracket contacting said second leg of said pawl bracket when said locking means is in said ready position; and said actuating means is a solenoid having a plunger connected to said first leg of said plunger bracket.

8. In a vehicle safety belt system adapted to restrain an occupant in a vehicle seat, the safety belt system including a shoulder belt, a retractor having a rewind mechanism biased to rewind the shoulder belt on a reel of the retractor, tension-relieving apparatus for relieving tension on the shoulder belt, the tension applied by the rewind mechanism of the retractor, the improvement of a release means for said shoulder belt tension-relieving apparatus, the release means comprising:

a switch disposed in a door jam of a door of said vehicle for sensing a condition when said door of the vehicle is open and when the door is closed;

a tension-relieving ratchet wheel connected to the reel of the retractor;

a tension-relieving locking pawl disposed on the retractor for locking said tension-relieving ratchet wheel, the tension-relieving locking pawl having a ready position wherein said tension-relieving locking pawl may be operated by said tension-relieving apparatus to deactivate the rewind mechanism, whereby tension on the shoulder belt is relieved, and an unlocking position wherein the rewind mechanism is allowed to wind the safety belt into the retractor, said switch causing said tension-relieving locking pawl to move to its ready position when said door is closed, said sensing means causing said tension-relieving locking pawl to move to its unlocking position when said door is open, thereby allowing the rewind mechanism to wind the shoulder belt into the retractor;

a solenoid mounted on the retractor adjacent to said locking pawl, mechanically coupled to a portion of said tension-relieving locking pawl and electrically coupled to said switch, said solenoid moving said tension-relieving locking pawl to its unlocking position and thereby allowing the rewind mechanism of the retractor to operate when the door is opened; and a biasing means biasing said tension-relieving locking pawl in its ready position.

9. In a vehicle safety belt system adapted to restrain an occupant in a vehicle seat, the safety belt system including a shoulder belt, a retractor having a rewind mechanism biased to rewind the shoulder belt on a reel of the retractor, tension-relieving apparatus for relieving tension on the shoulder belt, the tension applied by the rewind mechanism of the retractor, the improvement of a release means for said shoulder belt tension-relieving apparatus, the release means comprising:

a switch disposed in a door jam of a door of said vehicle for sensing a condition when said door of the vehicle is open and when the door is closed;

a tension-relieving ratchet wheel connected to the reel of the retractor;

a tension-relieving locking pawl disposed on the retractor for locking said tension-relieving ratchet wheel, the tension-relieving locking pawl having a ready position wherein said tension-relieving locking pawl may be operated by said tension-relieving apparatus to deactivate the rewind mechanism, whereby tension on the shoulder belt is relieved, and an unlocking position wherein the rewind mechanism is allowed to wind the safety belt into the retractor, said switch causing said tension-relieving locking pawl to move to its ready position when said door is closed, said sensing means causing said tension relieving locking pawl to move to its unlocking position when said door is open, thereby allowing the rewind mechanism to wind the shoulder belt into the retractor;

an electromagnet mounted on the retractor adjacent to said locking pawl, mechanically coupled to a portion of said tension-relieving locking pawl and electrically coupled to said switch, said electromagnet moving said tension-relieving locking pawl to its ready position and thereby allowing the rewind mechanism of the retractor to operate when the door is closed and allowing said locking pawl to move to its unlocking position when said door is open; and a biasing means biasing said tension-relieving locking pawl in its ready position.

10. In a vehicle safety belt system adapted to restrain an occupant in a vehicle seat, the safety belt system including a shoulder belt, a retractor having a rewind mechanism biased to rewind the shoulder belt on a reel of the retractor, tension-relieving apparatus for relieving tension on the shoulder belt, the tension applied by the rewind mechanism of the retractor, the improvement of a release means for said shoulder belt tension-relieving apparatus, the release means comprising:

a switch disposed in a door jam of a door of said vehicle for sensing a condition when said door of the vehicle is open and when the door is closed;

a tension-relieving ratchet wheel connected to the reel of the retractor;

a tension-relieving locking pawl disposed on the retractor for locking said tension-relieving ratchet wheel, the tension-relieving locking pawl having a ready position wherein said tension-relieving locking pawl may be operated by said tension-relieving apparatus to deactivate the rewind mechanism, whereby tension on the shoulder belt is relieved, and an unlocking position wherein the rewind mechanism is allowed to wind the safety belt into the retractor, said switch causing said tension-relieving locking pawl to move to its ready position when said door is closed, said sensing means causing said tension-relieving locking pawl to move to its unlocking position when said door is open, thereby allowing the rewind mechanism to wind the shoulder belt into the retractor;

a solenoid mounted on the retractor adjacent to said locking pawl, mechanically coupled to a portion of said tension-relieving locking pawl and electrically coupled to said switch, said solenoid moving said tension-relieving locking pawl to its unlocking position and thereby allowing the rewind mechanism of the retractor to operate when the door is opened;

a linkage means arranged between said solenoid and said pawl; and a biasing means biasing said tension-relieving locking pawl in its ready position.

11. In a vehicle safety belt system adapted to restrain an occupant in a vehicle seat, the safety belt system including a safety belt, a retractor having a rewind mechanism biased to rewind the safety belt on a reel of the retractor, a tension-relieving apparatus for relieving tension on the safety belt, the tension applied by the rewind mechanism of the retractor, the improvement of a release means for said tension-relieving apparatus, the release means comprising:

a sensing means disposed in said vehicle for operating said release means;

a tension-relieving locking means disposed on the retractor, the tension-relieving locking means having a ready position wherein said locking means may be operated by said tension-relieving apparatus and an unlocking position wherein the rewind mechanism is allowed to wind the safety belt into the retractor, said sensing means causing said tension-relieving locking means to move to its unlocking position thereby deactivating the tension-relieving apparatus and allowing the rewind mechanism to wind the safety belt into the retractor;

an actuating means mounted on the retractor adjacent to said locking means, mechanically coupled to a portion of said tension-relieving locking means and electrically coupled to said sensing means, said actuating means moving said tension-relieving locking means to its unlocking position thereby allowing the rewind mechanism of the retractor to operate under; and a biasing means biasing said tension-relieving locking means in its ready position, wherein said locking means may be operated by said tension relieving apparatus to block the rewind mechanism and relieving tension on the safety belt.

12. The safety belt tension-relieving apparatus of claim 11 wherein said locking means comprises: a tension-relieving ratchet wheel connected to the reel of the retractor and a locking pawl for locking said tension-relieving ratchet wheel.

13. The safety belt tension-relieving apparatus of claim 11 wherein said actuating means is a solenoid having a plunger coupled to said locking pawl.

14. The safety belt tension-relieving apparatus of claim 12 wherein said locking means further comprises linkage means connecting said locking pawl to said actuating means.

15. The safety belt tension-relieving apparatus of claim 12 wherein said locking means further comprises a pawl bracket having a first leg, a second leg, and a pivot point for said pawl bracket; said locking pawl mounted on said first leg and having a pawl pivot point on said first leg.

16. The safety belt tension-relieving apparatus of claim 15 wherein said actuating means is an electromagnet having a energized condition wherein said electromagnet applies a magnet force to said second leg of said pawl bracket to attract said second leg to said electromagnet and thereby move said pawl bracket and said tension-relieving locking pawl to said ready position.

17. The safety belt tension-relieving apparatus of claim 15 wherein said locking means further comprises a plunger bracket having a first leg, a second leg, and a pivot point for said plunger bracket; said second leg of said plunger bracket arranged adjacent said second leg of said pawl bracket, said second leg of said plunger bracket contacting said second leg of said pawl bracket when said locking means is in said ready position; and said actuating means is a solenoid having a plunger connected to said first leg of said plunger bracket.

* * * * *